United States Patent

Miyata et al.

[11] Patent Number: 5,217,670
[45] Date of Patent: Jun. 8, 1993

[54] METHOD OF FORMING MONOMOLECULAR FILM AND OVERLAYING APPARATUS THEREOF

[75] Inventors: Seizou Miyata, Tokyo; Hideo Kumehara, Saitama, both of Japan

[73] Assignee: Shingitjyutsu Kaihatsu Jigyoudan, Tokyo, Japan

[21] Appl. No.: 770,781

[22] Filed: Oct. 4, 1991

Related U.S. Application Data

[63] Continuation of Ser. No. 613,443, Nov. 13, 1990, abandoned, which is a continuation of Ser. No. 271,782, Jan. 17, 1989, filed as PCT/JP88/00272, Mar. 16, 1988, abandoned.

[30] Foreign Application Priority Data

Mar. 16, 1987 [JP] Japan ................................. 62-61640

[51] Int. Cl.[5] ............................................. B29C 39/02
[52] U.S. Cl. .................................... 264/298; 118/402; 118/421; 425/90; 425/93; 427/430.1

[58] Field of Search .................. 264/298; 425/90, 93; 427/430.1; 118/402, 403, 421, 429

[56] References Cited

U.S. PATENT DOCUMENTS

| | | | |
|---|---|---|---|
| 4,599,969 | 7/1986 | Barraud et al. | 118/429 |
| 4,840,821 | 6/1989 | Miyazaki et al. | 427/430.1 |

FOREIGN PATENT DOCUMENTS

| | | | |
|---|---|---|---|
| 61-291058 | 12/1986 | Japan | 118/402 |
| 62-274732 | 11/1987 | Japan . | |
| 62-286576 | 12/1987 | Japan . | |
| 62-294434 | 12/1987 | Japan . | |

OTHER PUBLICATIONS

Malcolm, B. R. "Studies of the Flow of Molecular Monolayers During Compression and the Effect of a Plateau in the Pressure-Area Curve." *Thin Solid Films*, vol. 134 (1985), pp. 201–208.

*Primary Examiner*—Leo B. Tentoni
*Attorney, Agent, or Firm*—Wenderoth, Lind & Ponack

7 Claims, 4 Drawing Sheets

METHOD OF FORMING MONOMOLECULAR FILM AND OVERLAYING APPARATUS THEREOF

This application is a continuation of now abandoned application Ser. No. 07/613,443 filed on Nov. 13, 1990, which is in turn a continuation of now abandoned application Ser. No. 271,782, filed Jan. 17, 1989, filed as PCT/JP88/00272, Mar. 16, 1988, abandoned.

BACKGROUND OF THE INVENTION

The present invention relates to a method of forming a monomolecular film on a liquid surface and an apparatus for overlaying the same as a single-layered or multi-layered film on a solid state substrate.

Presently a solid state electronic device, whether active or passive, mainly comprises a thin-film electronic material. In the manufacture thereof, the thin-film technology is being targeted for further refinement. That is, there is an expectation of developing new applications of thin-film technology because thin-film technology is actually becoming the key to success in much of the electronics industry. Under these circumstances, the role played by organic thin-film materials is now only becoming more important, wherein rapid progress is being made in the development of functional thin-film materials aimed at achieving a higher added value exceeding the limit of inorganic materials. Particular attention is being given to the technique for the preparation of a monomolecular single-layered or multilayered film (L-B film) as an organic thin-film.

An apparatus for preparing an L-B film as shown in FIG. 4, for example, has been employed. However, such a conventional apparatus and the method of using such an apparatus each have a serious defect. For example, the preparation of a single-layered film or a multi-layered film (L-B film) requires the formation of a stable solid-state film on a liquid surface from a monomolecular film substance, and maintaining fluidity on an appropriate level, not only in the well-known horizontal deposition method of forming an L-B film, but also in the vertical dipping method. When using a long-chain fatty acid as a component of an L-B film, overlaying can be easily accomplished if the metal ions of the metal salt of that long-chain fatty acid are binary metal ions, whereas, if they are triad metal ions, a hard film without fluidity is formed, thus making it extremely difficult to overlay the film on a substrate.

This finding is supported by "I. Languir, et al., J. Am. Chem. Soc., vol. 59 (1936)" and "M. Sugi, Solid-State Physics, vol. 17, No. 12 (1982)."

The development and application of L-B films, when using long-chain fatty acids, is therefore limited to those having binary ions, and this constitutes a hindrance to achieving technical progress in the development of L-B films. In fact, the actual situation is that almost no progress has been made in research on the development of L-B films using a long-chain fatty acid containing triad metal ions.

In the conventional L-B film forming apparatus, as shown in FIG. 4, because of the very small width of the solid-state substrate (B), to be vertically immersed, relative to the inner width of the trough (A), a disturbance is caused in the monomolecular film on the liquid surface, and this makes it extremely difficult to form a film in a normal state. Monomolecular film material flows around the substrate (B), thus producing a non-uniform film on the liquid surface. As a result, a hard film cannot form from this flow.

Because of this flow, even when a film has been formed on the substrate, the thus obtained film does not maintain the molecular configuration that it had on the liquid surface. Even by keeping a prescribed surface pressure on the liquid surface by means of a barrier, factors such as the coupling force between the trough inner walls and the monomolecular film material prevents the surface pressure from remaining uniform, and as shown in FIGS. 6(a) and 7(a), the monomolecular film material flows in a disturbed state.

For these reasons, a film formed on the substrate, if any, is defective.

These defects have been reported in "B. R. Malcon, Thin Solid Films, 134 (1985) 201-208," and the present inventor confirmed the fact both in theory and in experiments.

SUMMARY OF THE INVENTION

The present invention has been developed in view of the circumstances above and has as an object to provide a method of forming a monomolecular film on a liquid surface and an apparatus for overlaying the film as a single-layered or a multilayered film on a substrate, which eliminate the defects in the conventional method of and apparatus for forming an L-B film by solving such problems as those associated with the disturbances caused by the coupling force between the monomolecular film and the inner walls of the trough, and by the flow of the monomolecular film to the back of the substrate.

For the purpose of achieving the object as described above, the present invention provides a method of forming a monomolecular film on a liquid surface in an apparatus comprising a movable barrier arranged between opposite inner walls of the trough and extending on the liquid surface in the trough, and an auxiliary movable barrier contacting the liquid surface and formed integrally with said movable barrier, the method comprising: providing a substrate having a width equal to the length of said movable barrier and the width of said auxiliary movable barrier, causing a monomolecular film forming material to develop over a liquid surface enclosed by said apparatus, and driving said movable barriers parallel to the inner walls of the trough while keeping a constant relative position of the movable barriers and film forming material, thereby moving a prescribed amount of said material in contact with said auxiliary movable barrier. In addition, the present invention provides an overlaying apparatus for overlaying a monomolecular film as a single-layered or multi-layered film on a solid-state substrate, which comprises: a movable barrier arranged between opposite inner walls of said trough; a device for driving said movable barrier with a constant force; an auxiliary movable barrier in contact with the liquid surface and formed integrally with said movable barrier, said movable barrier and said auxiliary movable barrier being movable parallel to the inner walls while a constant relative position of the same is maintained. The apparatus is used with a substrate or the like having a width equal to the length of said movable barrier and the width of said auxiliary movable barrier. Finally, the apparatus comprises dipping means for moving the substrate relative to the liquid surface near the end of said auxiliary barrier contacting the liquid surface.

In the present invention, a prescribed surface pressure is maintained by keeping constant the relative position of the movable barrier and the auxiliary movable barrier with the monomolecular film on the liquid surface. Also, the auxiliary movable barrier is formed integrally with the movable barrier extending between the trough inner walls, and is so arranged that the monomolecular film contacts only the auxiliary movable barrier and the movable barrier integral therewith. As a result, the film is not in contact with the inner walls of the fixed trough as in the conventional apparatus, thus preventing disturbances of the monomolecular film from occurring. Since the substrate has a width equal to the length of the movable barrier and the width of the auxiliary movable barrier, the monomolecular film material will not flow past the ends of the substrate. Thus, no disturbances are produced. This permits a transfer of the film material to the substrate with the molecular configuration being maintained in a uniform state. Consequently, it is possible to form a single-layered or multi-layered (L-B film) with a uniform molecular density on the substrate.

DETAILED DESCRIPTION OF THE PREFERRED EMBODIMENT

Now, an embodiment of the present invention will be described with reference to the drawings.

Figure 1:
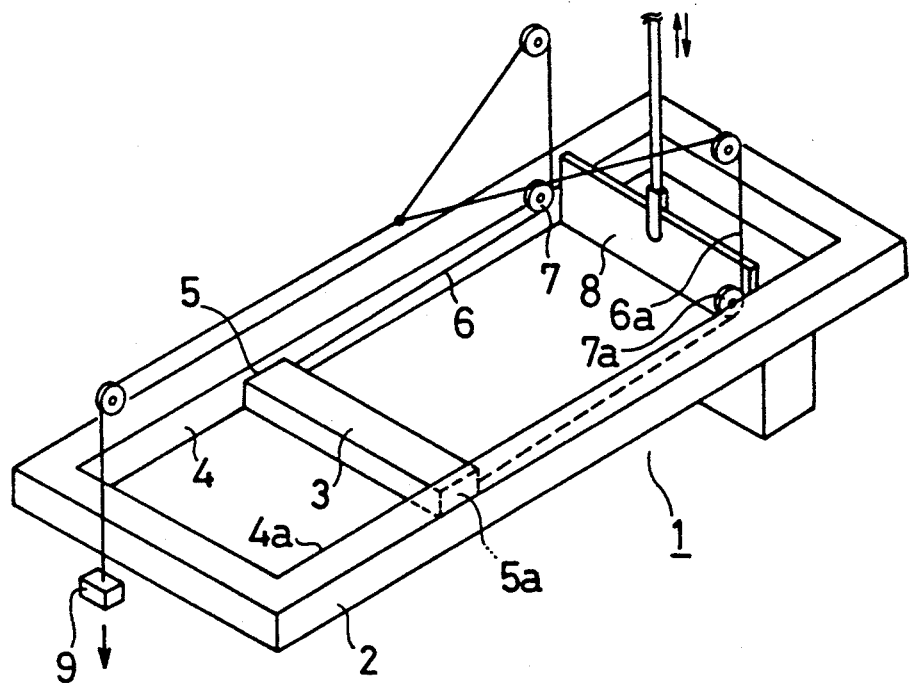
FIG. 1 is a perspective view of an embodiment of the apparatus for overlaying a single-layered or multilayered monomolecular film onto a substrate according to the present invention.

In the apparatus shown in FIG. 1, the main body (1) of the overlaying apparatus of a monomolecular single-layered or multilayered film has a rectangular shape. Pure water or the like with a pH properly adjusted to about 4.5 to 7.5 is stored in a trough (2). The trough (2) includes end walls (2a) and longitudinally extending side walls (2b) having upper terminal ends defining the upper rim (2c) of the trough (2). The main body (1) has an appropriate depth to facilitate the overlaying of a monomolecular film. A movable barrier (3) appropriately smaller in length than the transverse width of the trough (2) (preferably equal to the width of the solid-state substrate or the substrate holder) is provided on the liquid surface and is drivable in the longitudinal direction of said trough (2).

String-shaped auxiliary movable barriers (6) and (6a) made of an appropriate material are connected to the longitudinal ends (5) and (5a) of the movable barrier (3). Said auxiliary movable barriers (6) and (6a) extend on the water surface and are drawn via pulleys (7) and (7a) arranged at appropriate positions in the trough (2). A substrate (8) (vertically movable member) having a width equal to the length of the movable barriers (3) and to the distance between the auxiliary movable barriers (6) and (6a) is vertically movably provided immediately following said pulleys (7) and (7a). A member (21) supports the substrate so as to extend in the transverse direction of the trough (2). As clearly shown in FIGS. 1 and 2, the movable barrier (3) and the auxiliary barriers (6) and (6a) extend within the trough (2) below the upper rim (2c) thereof and will contact the surface of liquid in the trough. The pressure on the water surface bounded by the movable barrier (3), the auxiliary movable barriers (6) and (6a) and the substrate (8) is adjusted by means of a weight (9) (constant force generating means) or the like.

Figure 5A:
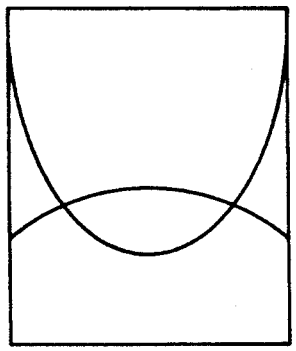
FIG. 5(a) is a schematic diagram illustrating a non-uniform state of a monomolecular film during the overlaying thereof onto a substrate in the conventional apparatus.
Figure 5B:
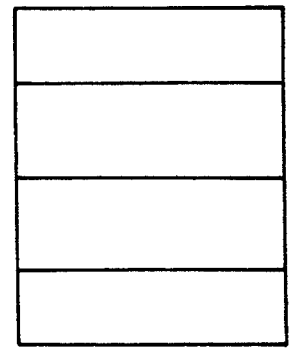
FIG. 5(b) is a schematic diagram illustrating a uniform state of a monomolecular film during the overlaying thereof onto a substrate in the apparatus of the present invention.
Figure 6A:
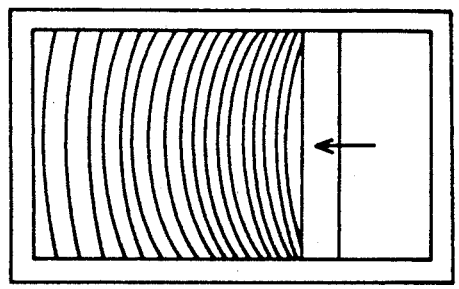
FIG. 6(a) is a schematic diagram illustrating the disturbance of the monomolecular film under a prescribed surface pressure in the conventional apparatus.
Figure 6B:
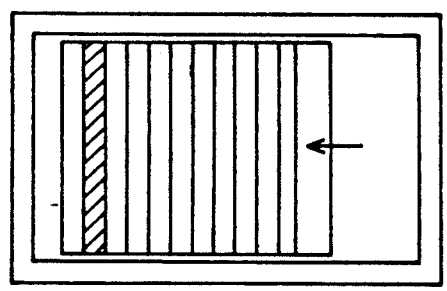
FIG. 6(b) is a schematic diagram illustrating a uniform state of a monomolecular film under a prescribed surface pressure in the apparatus of the present invention.
Figure 7A:
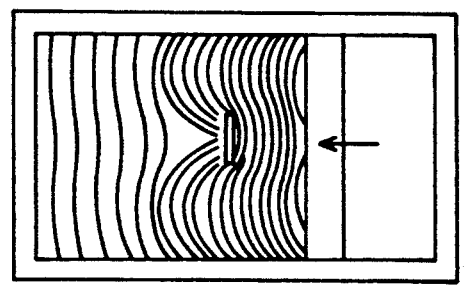
FIG. 7(a) is a schematic diagram illustrating the disturbance of a film on the liquid surface during vertical immersion of the substrate in the conventional apparatus.
Figure 7B:
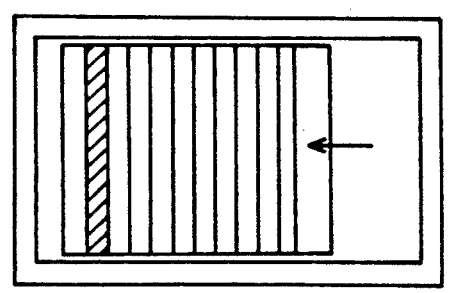
FIG. 7(b) is a schematic diagram illustrating a uniform state of a film on the liquid surface during vertical immersion of the substrate in the apparatus of the present invention, where the portion shaded with oblique lines represents the vertically moving substrate.
Figure 8:
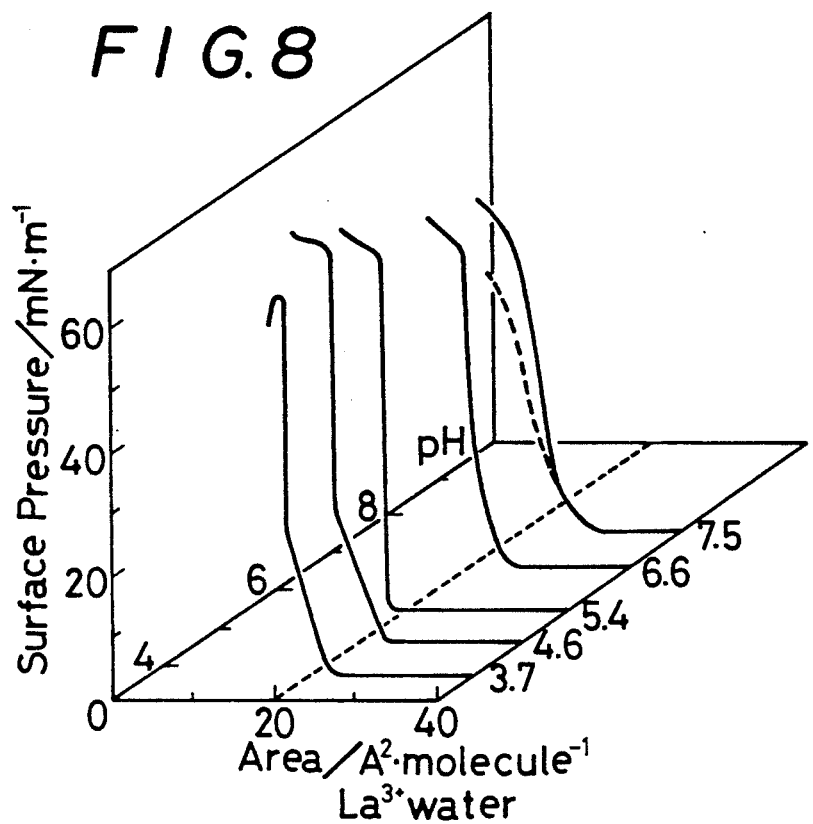
FIG. 8 is a graph of typical results of measurements of II-A curve for a film containing triad metal ions which have conventionally been difficult to obtain.
Figure 9:
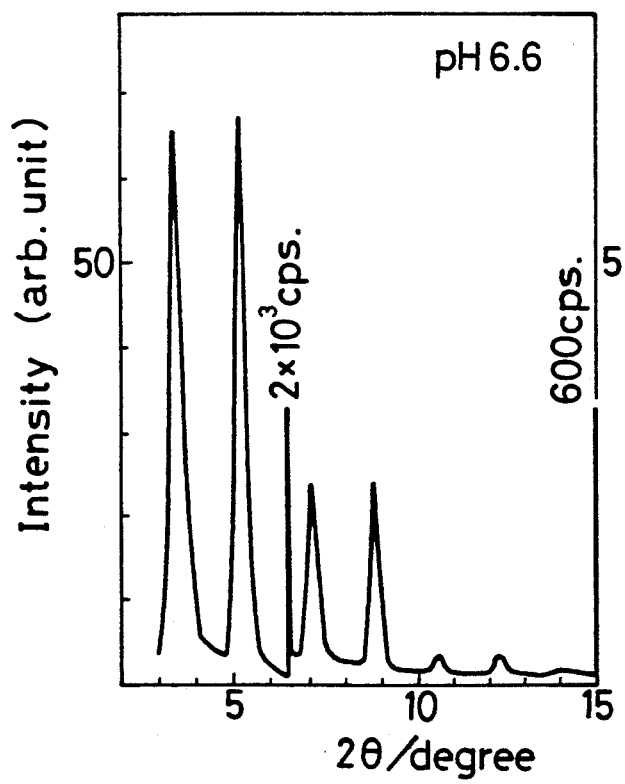
FIG. 9 is an X-ray diffraction spectrum of an overlayed film of triad metal ions which has conventionally been difficult to form.

By using such an apparatus as described above, it is possible to form a monomolecular film from a triad metal salt stearic acid and overlay a multilayered film thereof onto a substrate under the state shown in FIGS. 5(b), 6(b), and 9.

Now, further embodiments of the present invention will be described with reference to FIGS. 2 and 3.

Figure 2:
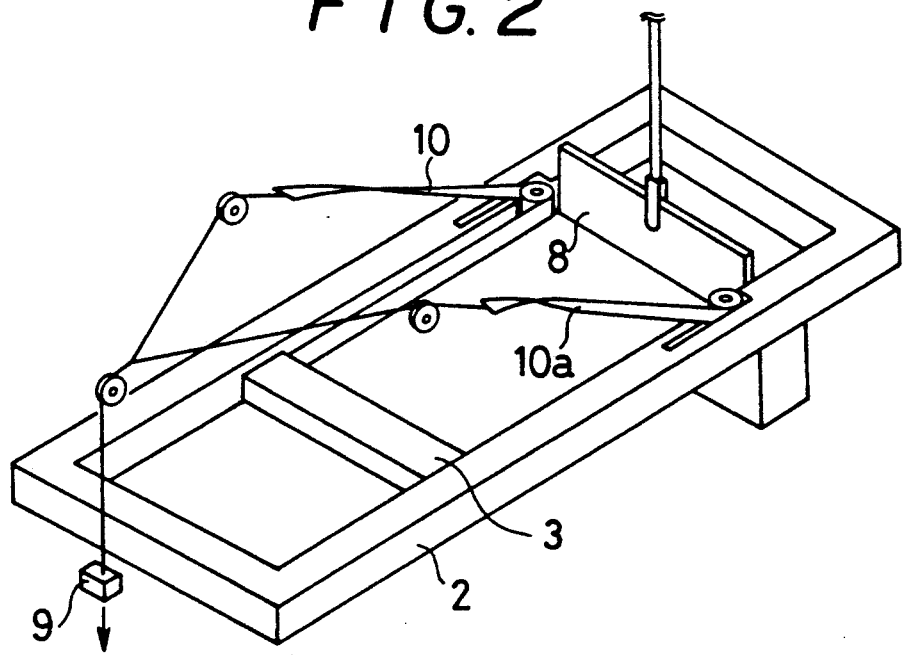
FIG. 2 is a perspective view of another embodiment thereof.

As shown in FIG. 2, auxiliary movable barriers (10) and (10a) comprising Teflon ribbons or the like having an appropriate width may be used in place of the string-shaped auxiliary movable barriers (6) and (6a) comprising silk threads or the like. This accommodates for adjustments in the water level.

Figure 3:
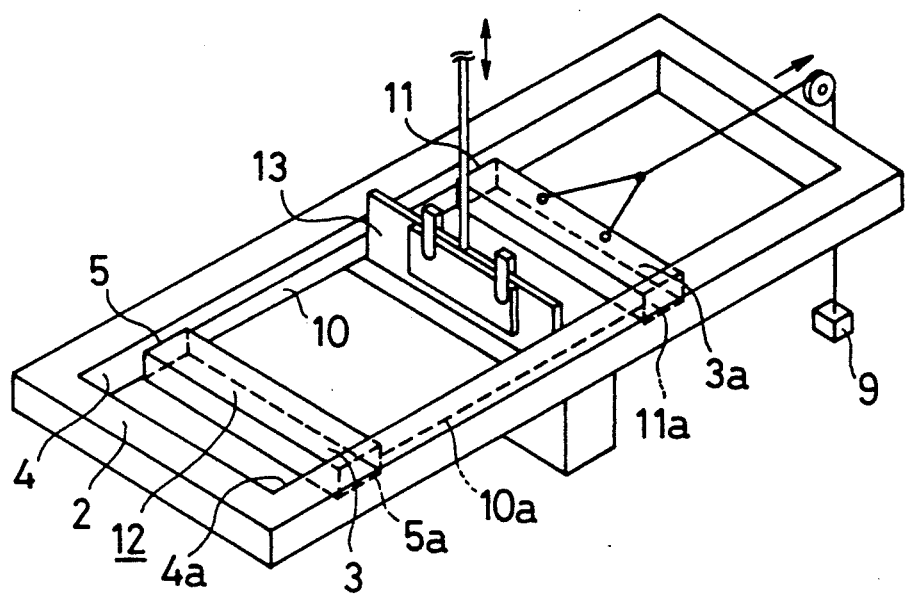
FIG. 3 is a perspective view of still another embodiment.
Figure 4:
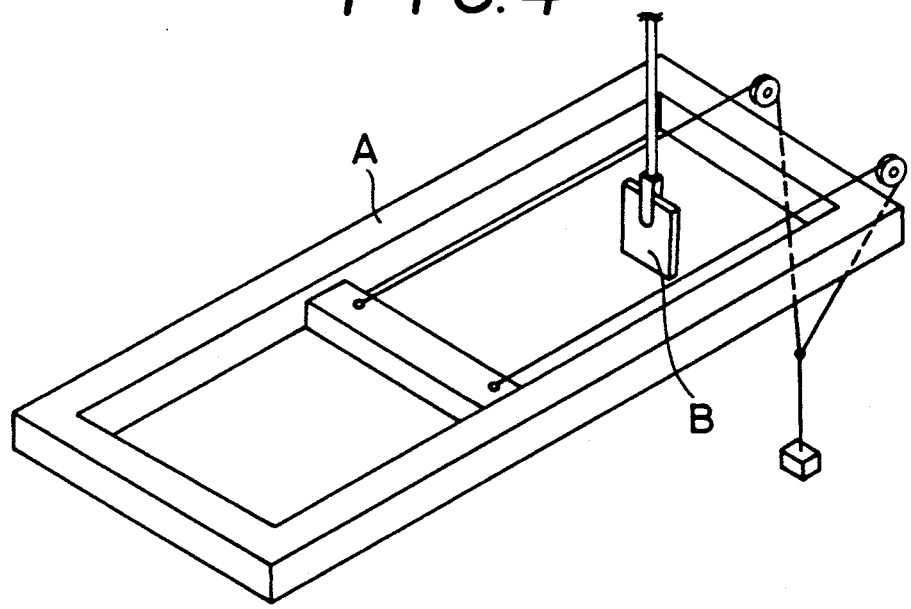
FIG. 4 is a perspective view of a conventional apparatus.

It is also possible to provide two movable barriers (3) and (3a) between the inner surfaces (4) and (4a) of the side walls of said trough (2), as shown in FIG. 3. These barriers (3) and (3a) also extend within the trough (2) below the upper rim (2c) thereof as clearly shown in FIG. 3. The movable barriers (3) and (3a) may be connected through the auxiliary movable barriers (10) and (10a) such as Teflon ribbons to the both ends (5), (5a), (11) and (11a) of said movable barriers (3) and (3a), thus forming an integral sliding body (12). A substrate holder (13) (vertically movable member) drivable vertically relative to the trough (2) and having a width substantially equal to that of the transverse width of the sliding body (12) may be arranged at an appropriate position within said trough (2).

It is needless to say that these embodiments are only examples and the present invention is not limited to such embodiments. For example, the weight (9) may be replaced by an appropriate driving mechanism for producing a certain force, or a prescribed surface pressure may be applied to the monomolecular film on the water surface by altering the relative positions of the trough (2) and the movable barriers (3) and (3a) with the sliding body (12).

The operation of the present invention will now be described.

In the present invention, the monomolecular film is never in contact with the inner walls (4) and (4a). The sliding body (12) composed of the movable barrier (3) or barriers (3) and (3a) and auxiliary movable barriers (6) and (6a) or (10) and (10a) formed integrally with the movable barrier (3) or barriers (3) and (3a) cause a transfer of the film to the substrate under a constant positional relationship which will prevent disturbances caused by the sliding of the film over the trough walls (4) and (4A) from occurring. The monomolecular film material never flows round-about past the ends of the substrate (8), since the substrate (8) has a width equal to the length of the movable barriers (3) and (3a) and the width of the auxiliary movable barriers (6) and (6a). As a result, no flow disturbances are caused in the monomolecular film with the molecular density kept constant, thus permitting the transfer of the film to substrate in a state in which the monomolecular film configuration is kept constant. It is therefore possible to overlay a monomolecular single-layered or multilayered film (L-B film) on the substrate (8).

Because the molecular material on the liquid surface is always kept in a constant state at all points on the liquid surface, a monomolecular film of a uniform molecular density can be formed.

Even though the substrate (8) or the like is vertically movable relative to the liquid surface, it is possible to keep constant the molecular configuration of the monomolecular film transferred to the substrate under a prescribed pressure on the liquid surface. As a result, a film can be deposited without fail on the substrate (8) by vertically immersing the substrate (8) relative to the liquid surface. A uniform overlaying of the film on the substrate is possible even for a film conventionally susceptible to breakage when disturbed, and for a hard monomolecular film without fluidity. Film formation is facilitated over a wide range of film forming conditions (temperature or pH range).

Because of these advantages of the present invention, it is now possible to form a uniform single-layered or multilayered film (L-B film) which up until now could not be practically applied, although the excellent characteristics thereof had been reported in experimental studies. In addition, the apparatus of the present invention permits the use of materials which have so far been unable to be overlayed on a substrate, thus achieving a remarkable improvement in the thin film technology of forming a functional thin film in an electronic device, thereby providing very useful industrial effects.

What is claimed is:

1. A method of overlaying a monomolecular film on a substrate, said method comprising:
   providing a trough including longitudinally extending side walls;
   filling the trough with liquid;
   providing a main movable barrier in contact with the surface of the liquid in the trough and extending in a transverse direction of the trough between the side walls thereof;
   providing a vertically movable member including a substrate opposing the main movable barrier in the trough and extending in the transverse direction of the trough over the same distance as the main movable barrier;
   providing auxiliary movable barriers in contact with the surface of the liquid in the trough and extending longitudinally of the side walls of the trough between ends of said main movable barrier and ends of the substrate, respectively;
   causing a monomolecular film to be formed on a portion of the surface of the liquid bonded by the main movable barrier, and the auxiliary movable barriers such that the film is in contact with the main movable barrier and the auxiliary movable barriers;
   after the monomolecular film is formed, moving the vertically movable member including the substrate vertically relative to the surface of the liquid, moving the main movable barrier toward the substrate and the auxiliary barriers parallel to the side walls of the trough while each of the barriers is in contact with the film, and maintaining the relative positional relationship between the barriers as the barriers are moved, so as to transfer the film bounded by the main movable barrier, the auxiliary barriers and the substrate onto the substrate without disturbances being produced in the film.

2. An apparatus for overlaying a monomolecular film on a substrate, said apparatus comprising:
   a trough including end walls and longitudinally extending side walls, each of said walls having upper terminal ends defining an upper rim of the trough;
   a main movable barrier extending in a transverse direction of the trough between the side walls thereof and below the upper rim of the trough so as to be able to contact the surface of liquid in the trough;
   auxiliary movable barrier extending, from ends of said main movable barrier, respectively, longitudinally of the side walls of said trough and below the upper rim of the trough so as to be able to contact the surface of liquid in the trough,
   each of said barriers being movable in directions parallel to the side walls of said trough, and said auxiliary movable barriers being integral with said main movable barrier such that the relative positional relationship between each of said barriers is maintained as all of said barriers are moved in the apparatus;
   means for supporting a substrate so as to extend in the transverse direction of the trough and for moving a substrate supported thereby vertically relative to said trough at a location adjacent where said auxiliary barriers extend below the upper rim of the trough; and
   constant force generating means connected to said main movable barrier for causing said main movable barrier to exert a constant force of the surface of liquid in contact therewith as said main movable barrier is moved parallel to the side walls of the trough.

3. An apparatus as claimed in claim 2, wherein said auxiliary barriers comprise ribbons of polytetrafluoroethylene.

4. An apparatus as claimed in claim 2, wherein said auxiliary barriers comprise silk threads.

5. An apparatus as claimed in claim 2, and further comprising a second main movable barrier extending in a transverse direction of the trough between the side walls thereof and below the upper rim of the trough so as to be able to contact the surface of liquid in the trough, said auxiliary movable barriers extending between and connected to respective ends of said main movable barriers.

6. An apparatus as claimed in claim 5, wherein said means for supporting and for moving a substrate includes a substrate holder extending over the same distance as said main movable barriers in the transverse direction of said trough.

7. An apparatus as claimed in claim 2, wherein said means for supporting and for moving a substrate includes a substrate holder extending over the same distance as said main movable barrier in the transverse direction of said trough.

* * * * *